(12) United States Patent
Liu et al.

(10) Patent No.: US 12,081,873 B2
(45) Date of Patent: Sep. 3, 2024

(54) IMAGE PROCESSING DEVICE, IMAGE PROCESSING METHOD, AND NON-TRANSITORY STORAGE MEDIUM

(71) Applicant: NEC Corporation, Tokyo (JP)

(72) Inventors: Jianquan Liu, Tokyo (JP); Junnan Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 462 days.

(21) Appl. No.: 17/617,420

(22) PCT Filed: Jun. 13, 2019

(86) PCT No.: PCT/JP2019/023509
§ 371 (c)(1),
(2) Date: Dec. 8, 2021

(87) PCT Pub. No.: WO2020/250387
PCT Pub. Date: Dec. 17, 2020

(65) Prior Publication Data
US 2022/0247924 A1  Aug. 4, 2022

(51) Int. Cl.
*H04N 23/698* (2023.01)
*H04N 23/611* (2023.01)

(52) U.S. Cl.
CPC ......... *H04N 23/698* (2023.01); *H04N 23/611* (2023.01)

(58) Field of Classification Search
None
See application file for complete search history.

(56) References Cited

U.S. PATENT DOCUMENTS 5,990,941 A * 11/1999 Jackson ............... H04N 5/2628
 348/E7.087
6,687,387 B1 * 2/2004 Molnar .................... G06T 5/80
 348/154
(Continued)

FOREIGN PATENT DOCUMENTS

JP 2011182176 A * 9/2011
JP 2012-141972 A 7/2012
(Continued)

OTHER PUBLICATIONS

Japanese Office Action for JP Application No. 2021-525512 mailed on Jan. 31, 2023 with English Translation.
(Continued)

*Primary Examiner* — Stefan Gadomski
(74) *Attorney, Agent, or Firm* — Sughrue Mion, PLLC

(57) ABSTRACT

The present invention provides an image processing apparatus (10) including a detection unit (12) that detects a plurality of predetermined points of a body of each of a plurality of persons from an image in an image circle of a fisheye image, a gravity direction determination unit (13) that determines a gravity direction in a position of each of the plurality of persons from the plurality of predetermined points, a reference point decision unit (14) that decides a reference point, based on the gravity direction in the position of each of the plurality of persons, a complementary circular image generation unit (16) that generates a complementary circular image that is a circular image acquired by adding a complementary image to the image in the image circle of the fisheye image, and that has, as a center, the reference point different from a center of the image in the image circle, and an expansion unit (17) that panoramically expands the complementary circular image, based on the reference point, and generates a panoramic image.

13 Claims, 17 Drawing Sheets

(56) References Cited

U.S. PATENT DOCUMENTS

| | | | |
|---|---|---|---|
| 2001/0040624 A1* | 11/2001 | Kobayashi | H04N 7/188 348/E7.086 |
| 2002/0118890 A1* | 8/2002 | Rondinelli | G06T 3/12 382/276 |
| 2006/0215930 A1* | 9/2006 | Terui | G06T 3/4038 382/233 |
| 2008/0068601 A1* | 3/2008 | Thayer | G01B 11/24 356/241.3 |
| 2009/0160940 A1* | 6/2009 | Imamura | H04N 7/181 348/148 |
| 2009/0303351 A1* | 12/2009 | Ogawa | H04N 23/683 348/231.6 |
| 2010/0053325 A1* | 3/2010 | Inagaki | G06T 3/18 382/282 |
| 2011/0018964 A1* | 1/2011 | Krishnan | G06T 5/50 348/36 |
| 2012/0093365 A1* | 4/2012 | Aragane | G06T 5/80 348/E7.078 |
| 2012/0154643 A1 | 6/2012 | Okuyama et al. | |
| 2012/0257064 A1* | 10/2012 | Kim | G08B 13/19632 348/E7.085 |
| 2012/0274782 A1* | 11/2012 | Kitaguchi | G06V 10/754 348/169 |
| 2013/0314444 A1* | 11/2013 | Iwamoto | G06T 5/00 345/647 |
| 2014/0314336 A1* | 10/2014 | Yagi | G06T 3/12 382/282 |
| 2015/0312498 A1* | 10/2015 | Kawano | G06V 20/40 348/222.1 |
| 2016/0028951 A1 | 1/2016 | Mayuzumi | |
| 2016/0080699 A1* | 3/2016 | Scholl | G06T 3/08 348/148 |
| 2016/0234438 A1* | 8/2016 | Satoh | H04N 23/667 |
| 2016/0360104 A1* | 12/2016 | Zhang | H04N 23/698 |
| 2017/0011539 A1* | 1/2017 | Oshima | B60R 11/04 |
| 2017/0039457 A1 | 2/2017 | Yu et al. | |
| 2017/0076477 A1* | 3/2017 | Nakakusu | G06T 3/12 |
| 2017/0243384 A1* | 8/2017 | Huang | G06T 3/4038 |
| 2017/0287107 A1* | 10/2017 | Forutanpour | G06T 3/047 |
| 2017/0287200 A1* | 10/2017 | Forutanpour | G06T 3/12 |
| 2017/0324943 A1* | 11/2017 | Wu | G06T 11/60 |
| 2017/0330337 A1* | 11/2017 | Mizutani | G06T 5/50 |
| 2018/0012335 A1* | 1/2018 | Adsumilli | H04N 23/698 |
| 2018/0027181 A1* | 1/2018 | Roulet | G06T 5/70 348/38 |
| 2018/0061000 A1* | 3/2018 | Kawaguchi | G06T 5/50 |
| 2018/0146136 A1* | 5/2018 | Yamamoto | H04N 23/50 |
| 2018/0204387 A1* | 7/2018 | Utsugi | G06T 15/205 |
| 2018/0255307 A1* | 9/2018 | Douady-Pleven | G06T 1/60 |
| 2018/0268528 A1* | 9/2018 | Matsushita | H04N 25/61 |
| 2018/0286026 A1* | 10/2018 | Fan | G06T 5/50 |
| 2018/0343472 A1* | 11/2018 | Wang | H04N 21/85406 |
| 2018/0357804 A1* | 12/2018 | Forutanpour | G06T 11/60 |
| 2019/0014260 A1* | 1/2019 | Mu | G06T 3/18 |
| 2019/0014269 A1* | 1/2019 | Wang | H04N 23/54 |
| 2019/0014350 A1* | 1/2019 | Wang | H04N 21/84 |
| 2019/0020802 A1* | 1/2019 | Melkote Krishnaprasad | G06T 3/4038 |
| 2019/0098274 A1* | 3/2019 | Douady-Pleven | H04N 9/646 |
| 2019/0208141 A1* | 7/2019 | Oyama | H04N 23/681 |
| 2019/0208142 A1* | 7/2019 | Kitaya | H04N 23/63 |
| 2019/0236805 A1* | 8/2019 | Mou | G06T 3/047 |
| 2019/0306419 A1* | 10/2019 | Kajiwara | H04N 23/50 |
| 2019/0313075 A1* | 10/2019 | Moss | H04N 13/194 |
| 2020/0126179 A1* | 4/2020 | Yan | G06T 3/4038 |
| 2020/0382757 A1* | 12/2020 | Oh | H04N 21/4318 |
| 2021/0072518 A1* | 3/2021 | Giordano | H04N 23/55 |
| 2021/0073956 A1* | 3/2021 | Guerin | G06T 5/73 |
| 2021/0084281 A1* | 3/2021 | Douady | H04N 13/239 |
| 2022/0198605 A1* | 6/2022 | Pitts | G06T 3/047 |

FOREIGN PATENT DOCUMENTS

| | | |
|---|---|---|
| JP | 2013-127739 A | 6/2013 |
| JP | 2016-025516 A | 2/2016 |
| JP | 2018-524678 A | 8/2018 |

OTHER PUBLICATIONS

International Search Report for PCT Application No. PCT/JP2019/023509, mailed on Aug. 13, 2019.

Kensho Hara et al., "Can Spatiotemporal 3D CNNs Retrace the History of 2D CNNs and ImageNet?". [online], Proceedings of the IEEE conference on Computer Vision and Pattern Recognition (pp. 6548-6555), [searched on May 28, 2019], Internet <URL: http://openaccess.thecvf.com/content_cvpr_2018/papers/Hara_Can_Spatiotemporal_3D_CVPR_2018_paper.pdf>.

* cited by examiner

FIG. 1
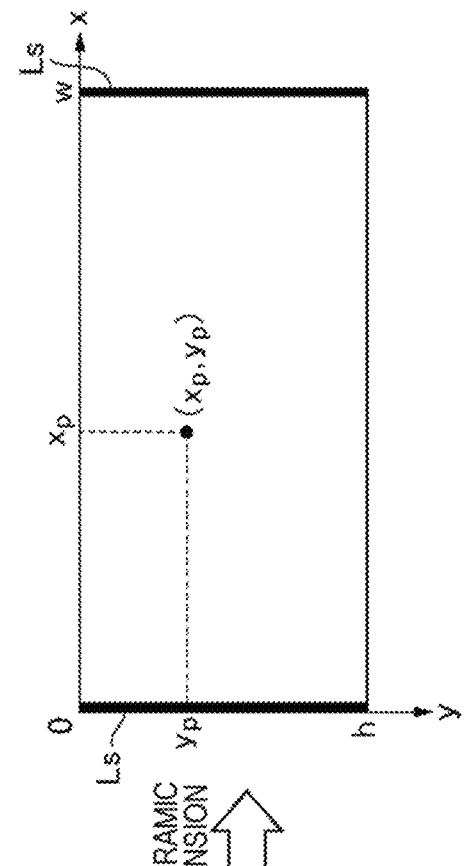
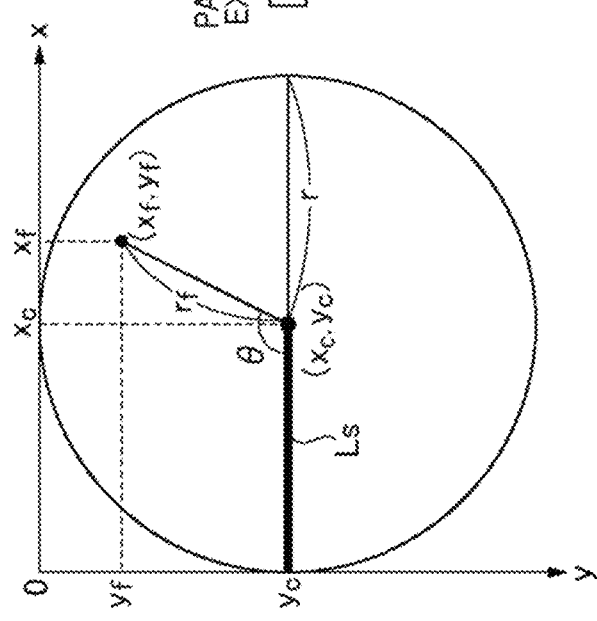

P1.mid shoulder
P2.mid hip

Rotate image by 90 degree

Rotate image by 180 degree

Rotate image by 270 degree

IMAGE PROCESSING DEVICE, IMAGE PROCESSING METHOD, AND NON-TRANSITORY STORAGE MEDIUM

This application is a National Stage Entry of PCT/JP2019/023509 filed on Jun. 13, 2019, the contents of all of which are incorporated herein by reference, in their entirety.

TECHNICAL FIELD

The present invention relates to an image processing apparatus, an image processing method, and a program.

BACKGROUND ART

Patent Document 1 discloses a technique for performing machine learning with a training image and information for identifying a business store location. Then, Patent Document 1 discloses that a panoramic image, an image having a field of view greater than 180°, and the like can be set as a training image.

Non-Patent Document 1 discloses a technique for estimating person behavior indicated by a moving image, based on a 3D-convolutional neural network (CNN).

RELATED DOCUMENT

Patent Document

[Patent Document 1] Japanese Patent Application Publication (Translation of PCT Application) No. 2018-524678

Non-Patent Document

[Non-Patent Document 1] Kensho Hara, two others, "Can Spatiotemporal 3D CNNs Retrace the History of 2D CNNs and ImageNet?", [online], Proceedings of the IEEE conference on Computer Vision and Pattern Recognition (pp. 6546-6555), [searched on May 28, 2019], Internet <URL: http://openaccess.thecvf.com/content_cvpr_2018/papers/Hara_Can_Spatiotemporal_3D_CVPR_2018_paper.pdf>

DISCLOSURE OF THE INVENTION

Technical Problem

In an image (hereinafter may be referred to as a "fisheye image") generated by a fisheye lens camera, distortion occurs, and thus a gravity direction may vary for each position in the image. Thus, an unnatural situation where a direction in which a body of a standing person extends varies for each position in an image, and the like may occur. Even when such a fisheye image is input to an estimation model generated by machine learning based on an image (learning data) generated by a standard lens (for example, an angle of view of around 40° to around 60°) camera, a sufficient estimation result cannot be acquired.

As a means for solving the problem, a means for panoramically expanding a fisheye image and generating a panoramic image is conceivable. For example, a fisheye image can be panoramically expanded by a technique disclosed in FIG. 1.

First, in order to perform panoramic expansion, a reference line $L_s$, a reference point $(x_c, y_c)$, a width w and a height h need to be determined.

The reference line $L_s$ is a position in which a fisheye image is cut open, and is located at an end portion in a panoramic image. There are various ways of determining the reference line $L_s$.

The reference point $(x_c, y_c)$ is the center of a circular image in an image circle of the fisheye image.

The width w is a width of the panoramic image, and the height h is a height of the panoramic image. These values may be default values, or may be set to any values by a user.

When these values are determined, any target point $(x_f, y_f)$ in the fisheye image can be converted into a point $(x_p, y_p)$ in the panoramic image, based on an illustrated equation of "panoramic expansion". When any target point $(x_f, y_f)$ in the fisheye image is specified, a distance $r_f$ between the reference point $(x_c, y_c)$ and the target point $(x_f, y_f)$ can be computed. Similarly, an angle θ formed between a line connecting the reference point $(x_c, y_c)$ and the target point $(x_f, y_f)$, and the reference line $L_s$ can be computed. As a result, the values of the variables w, θ, h, $r_f$, and r are determined in the illustrated equation of the "panoramic expansion". Note that, r is a radius of the image in the image circle. By substituting the values of the variables into the equation, the point $(x_p, y_p)$ can be computed.

Further, a panoramic image can also be converted into a fisheye image by an illustrated equation of "inverse panoramic expansion".

By panoramically expanding a fisheye image and generating a panoramic image, the above-described unnaturalness of an image can be certainly reduced. However, in a case of the technique described above, when the reference point $(x_c, y_c)$ is not located in an appropriate position in an image, the above-described unnaturalness may also remain in a panoramic image.

An object captured at the center of an image in an image circle of a fisheye image may change in response to an orientation and the like of a camera during capturing. In a case of a method of uniformly setting, as the reference point $(x_c, y_c)$, the center of an image in an image circle of a fisheye image in which a captured object may change in response to an orientation and the like of a camera during capturing in such a manner, a problem that setting of the reference point $(x_c, y_c)$ becomes inappropriate and the above-described unnaturalness remains in a panoramic image may occur.

An object of the present invention is to provide a new technique for panoramically expanding a fisheye image in order to reduce the problem.

Solution to Problem

The present invention provides an image processing apparatus including
 a complementary circular image generation means for generating a complementary circular image that is a circular image acquired by adding a complementary image to an image in an image circle in an image generated by a fisheye lens camera, and that has, as a center, a reference point different from a center of the image in the image circle, and
 an expansion means for panoramically expanding the complementary circular image, based on the reference point, and generating a panoramic image.

Further, the present invention provides an image processing method including,
 by a computer,
 generating a complementary circular image that is a circular image acquired by adding a complementary image to an image in an image circle in an image generated by a fisheye lens camera, and that has, as a center, a reference point different from a center of the image in the image circle, and panoramically expanding the complementary circular image, based on the reference point, and generating a panoramic image.

Further, the present invention provides a program causing a computer to function as a complementary circular image generation means for generating a complementary circular image that is a circular image acquired by adding a complementary image to an image in an image circle in an image generated by a fisheye lens camera, and that has, as a center, a reference point different from a center of the image in the image circle, and an expansion means for panoramically expanding the complementary circular image, based on the reference point, and generating a panoramic image.

Advantageous Effects of Invention

The present invention achieves a new technique for panoramically expanding a fisheye image.

BRIEF DESCRIPTION OF THE DRAWINGS

The above-described object, the other objects, features, and advantages will become more apparent from suitable example embodiment described below and the following accompanying drawings.

FIG. 1 is a diagram for describing a technique of panoramic expansion.

DESCRIPTION OF EMBODIMENTS

Overall Perspective and Overview of System

Figure 2:
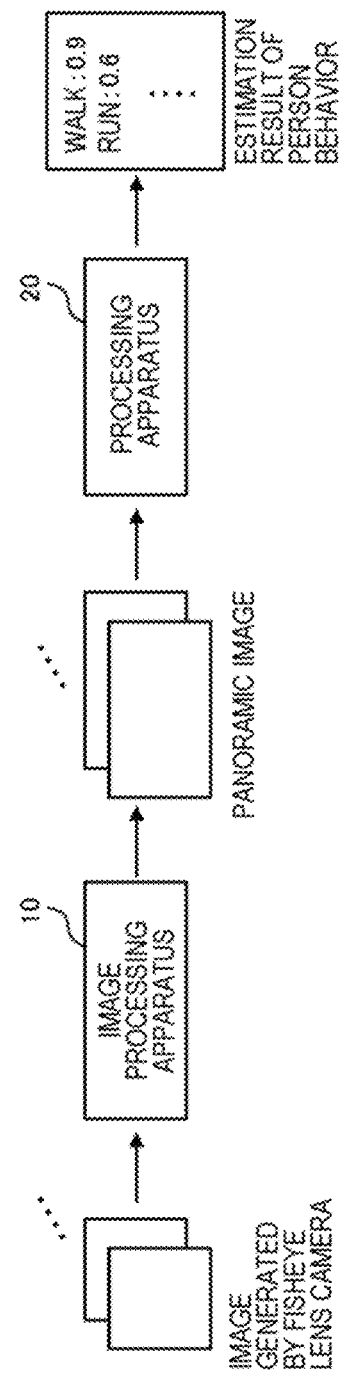
FIG. 2 is a diagram for describing an overall perspective of a system according to the present example embodiment.

First, an overall perspective and an overview of a system according to the present example embodiment will be described by using FIG. 2. The system according to the present example embodiment includes an image processing apparatus 10 and a processing apparatus 20.

The image processing apparatus 10 panoramically expands an input fisheye image, and generates a panoramic image. The image processing apparatus 10 panoramically expands a fisheye image by the technique described by using FIG. 1, but includes a means for appropriately setting a reference point $(x_c, y_c)$ instead of uniformly setting, as the reference point $(x_c, y_c)$, the center of an image in an image circle of a fisheye image. Details thereof will be described later. In a panoramic image generated by such an image processing apparatus 10, a trouble that a direction in which a body of a standing person extends varies is reduced.

The processing apparatus 20 estimates person behavior indicated by a plurality of input panoramic images (moving images). The processing apparatus 20 generates, from a plurality of time-series two-dimensional images (panoramic images), three-dimensional feature information indicating a time change of a feature in each position in the image, based on a 3D-CNN, and also generates person position information indicating a position in which a person is present in each of the plurality of images. Then, the processing apparatus 20 estimates person behavior indicated by the plurality of images, based on the time change of the feature indicated by the three-dimensional feature information in the position in which the person is present being indicated by the person position information. Such a processing apparatus 20 can perform estimation of person behavior by using only information related to a person in three-dimensional feature information, and thus estimation accuracy improves.

Hardware Configuration

Hereinafter, a configuration of the system according to the present example embodiment will be described in detail. First, one example of a hardware configuration of the image processing apparatus 10 and the processing apparatus 20 will be described. Each functional unit included in each of the image processing apparatus 10 and the processing apparatus 20 is achieved by any combination of hardware and software concentrating on as a central processing unit (CPU) of any computer, a memory, a program loaded into the memory, a storage unit such as a hard disk that stores the program (that can also store a program downloaded from a storage medium such as a compact disc (CD), a server on the Internet, and the like, in addition to a program previously stored at a stage of shipping of an apparatus), and a network connection interface. Then, various modification examples of an achievement method and an apparatus thereof are understood by a person skilled in the art.

Figure 3:
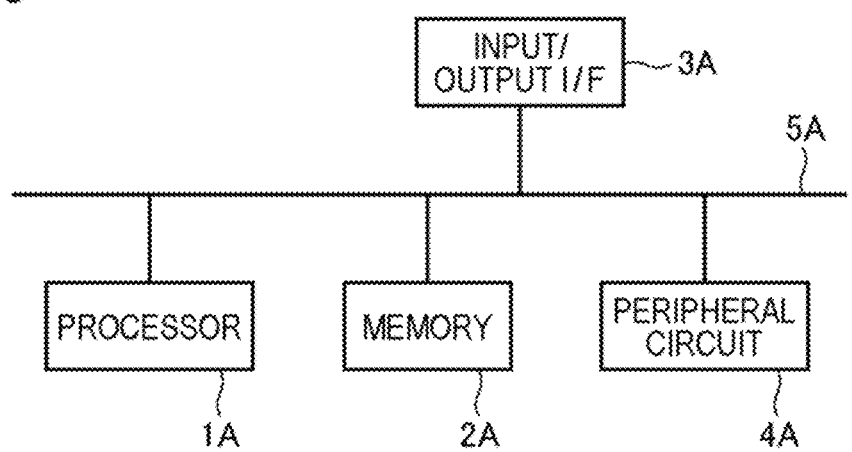
FIG. 3 is a diagram illustrating one example of a hardware configuration of an image processing apparatus and a processing apparatus according to the present example embodiment.

FIG. 3 is a block diagram illustrating a hardware configuration of each of the image processing apparatus 10 and the processing apparatus 20. As illustrated in FIG. 3, each of the image processing apparatus 10 and the processing apparatus 20 includes a processor 1A, a memory 2A, an input/output interface 3A, a peripheral circuit 4A, and a bus 5A. Various modules are included in the peripheral circuit 4A. Each of the image processing apparatus 10 and the processing apparatus 20 may not include the peripheral circuit 4A. Note that, each of the image processing apparatus 10 and the processing apparatus 20 may be formed of a plurality of apparatuses separated physically and/or logically, or may be formed of one apparatus integrated physically and/or logically. When each of the image processing apparatus 10 and the processing apparatus 20 is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Functional Configuration of Image Processing Apparatus 10

Figure 4:
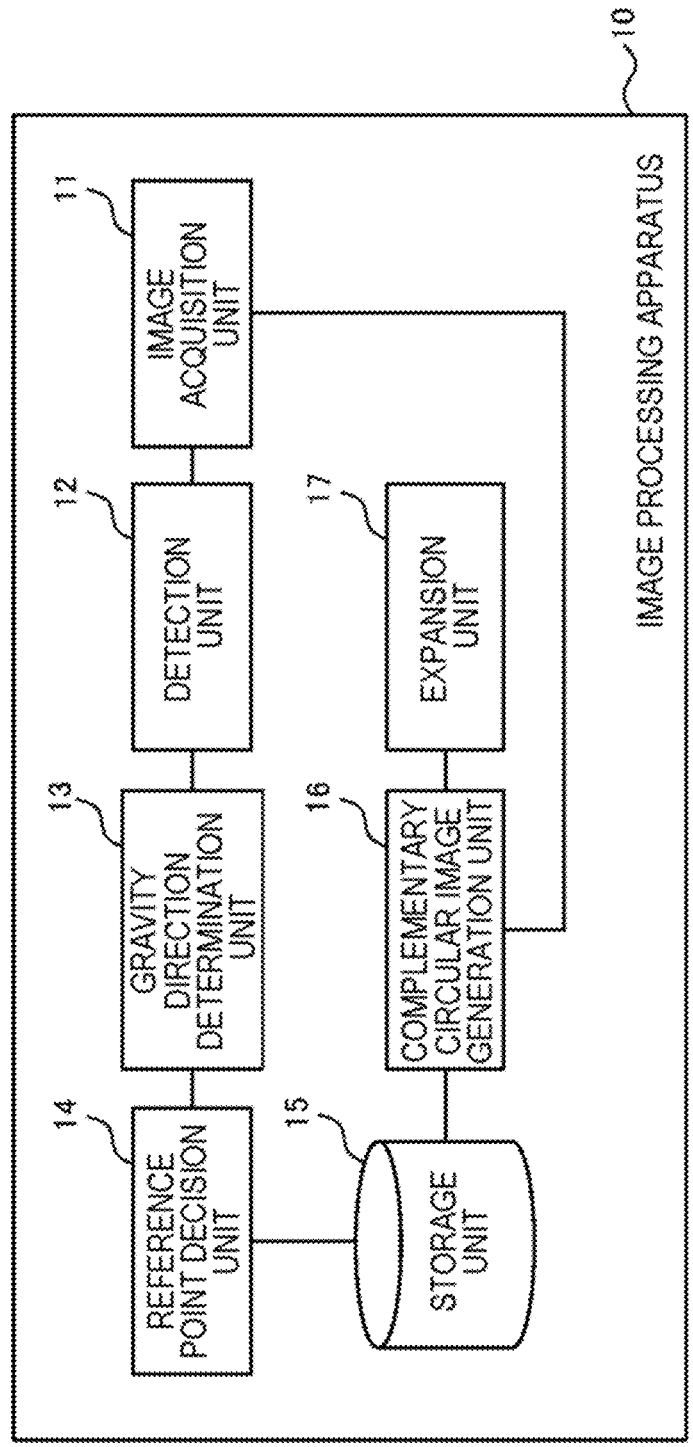
FIG. 4 is one example of a functional block diagram of the image processing apparatus according to the present example embodiment.

Next, a functional configuration of the image processing apparatus 10 will be described in detail. FIG. 4 illustrates one example of a functional block diagram of the image processing apparatus 10. As illustrated, the image processing apparatus 10 includes an image acquisition unit 11, a detection unit 12, a gravity direction determination unit 13, a reference point decision unit 14, a storage unit 15, a complementary circular image generation unit 16, and an expansion unit 17.

The image acquisition unit 11 acquires a fisheye image. In the present specification, "acquisition" may include "acquisition of data stored in another apparatus or a storage medium by its own apparatus (active acquisition)", based on a user input or an instruction of a program, such as reception by making a request or an inquiry to another apparatus, and reading by accessing to another apparatus or a storage medium, for example. Further, "acquisition" may include "inputting of data output from another apparatus to its own apparatus (passive acquisition)", based on a user input or an instruction of a program, such as reception of data to be distributed (or transmitted, push-notified, or the like), for example. Further, "acquisition" may include acquisition by selection from among pieces of received data or pieces of received information, and "generation of new data by editing data (such as texting, sorting of data, extraction of a part of data, and change of a file format) and the like, and acquisition of the new data".

The detection unit 12 detects a plurality of predetermined points of a body of each of a plurality of persons from an image in an image circle of a fisheye image. Then, the gravity direction determination unit 13 determines a gravity direction (perpendicular direction) in a position of each of the plurality of persons, based on the plurality of predetermined points detected by the detection unit 12.

For example, the detection unit 12 may detect a plurality of points (two points) of a body in which a line connecting the points is parallel to the gravity direction in an image generated by capturing a standing person from the front. As a combination of such two points, (a middle of both shoulders, a middle of a waist), (a tip of a head, a middle of a waist), (a tip of a head, a middle of both shoulders), and the like are exemplified, which are not limited thereto. In a case of this example, the gravity direction determination unit 13 determines, as the gravity direction, a direction from a predetermined one point of the two points detected in association with each person toward the other point.

As another example, the detection unit 12 may detect a plurality of points (two points) of a body in which a line connecting the points is perpendicular to the gravity direction in an image generated by capturing a standing person from the front. As a combination of such two points, (a right shoulder, a left shoulder), (a right waist, a left waist), and the like are exemplified, which are not limited thereto. In a case of this example, the gravity direction determination unit 13 determines, as the gravity direction, a direction in which a line that passes through a middle point of the two points detected in association with each person and is perpendicular to a line connecting the two points extends.

Note that, the detection unit 12 can detect the above-described plurality of points of a body by using various techniques for an image analysis. The detection unit 12 can detect a plurality of predetermined points of a body of each of a plurality of persons by analyzing a fisheye image with the same algorithm as an "algorithm that detects a plurality of predetermined points of a body of each person being present in an image generated by a standard lens (for example, an angle of view of around 40° to around 60°) camera".

However, a direction in which a body of a standing person extends may vary in a fisheye image. Then, the detection unit 12 may perform an analysis of an image while rotating a fisheye image. In other words, the detection unit 12 may perform, at a plurality of rotation angles, processing of rotating an image in an image circle of a fisheye image, analyzing the image in the image circle after the rotation, and detecting a plurality of predetermined points of a body of a person.

By using FIGS. 5 to 8, an overview of the processing will be described. In an example in FIG. 5, five persons M1 to M5 are present in an image C1 in an image circle of a fisheye image F. All of the five persons M1 to M5 are standing, but a direction in which a body extends varies.

Figure 5:
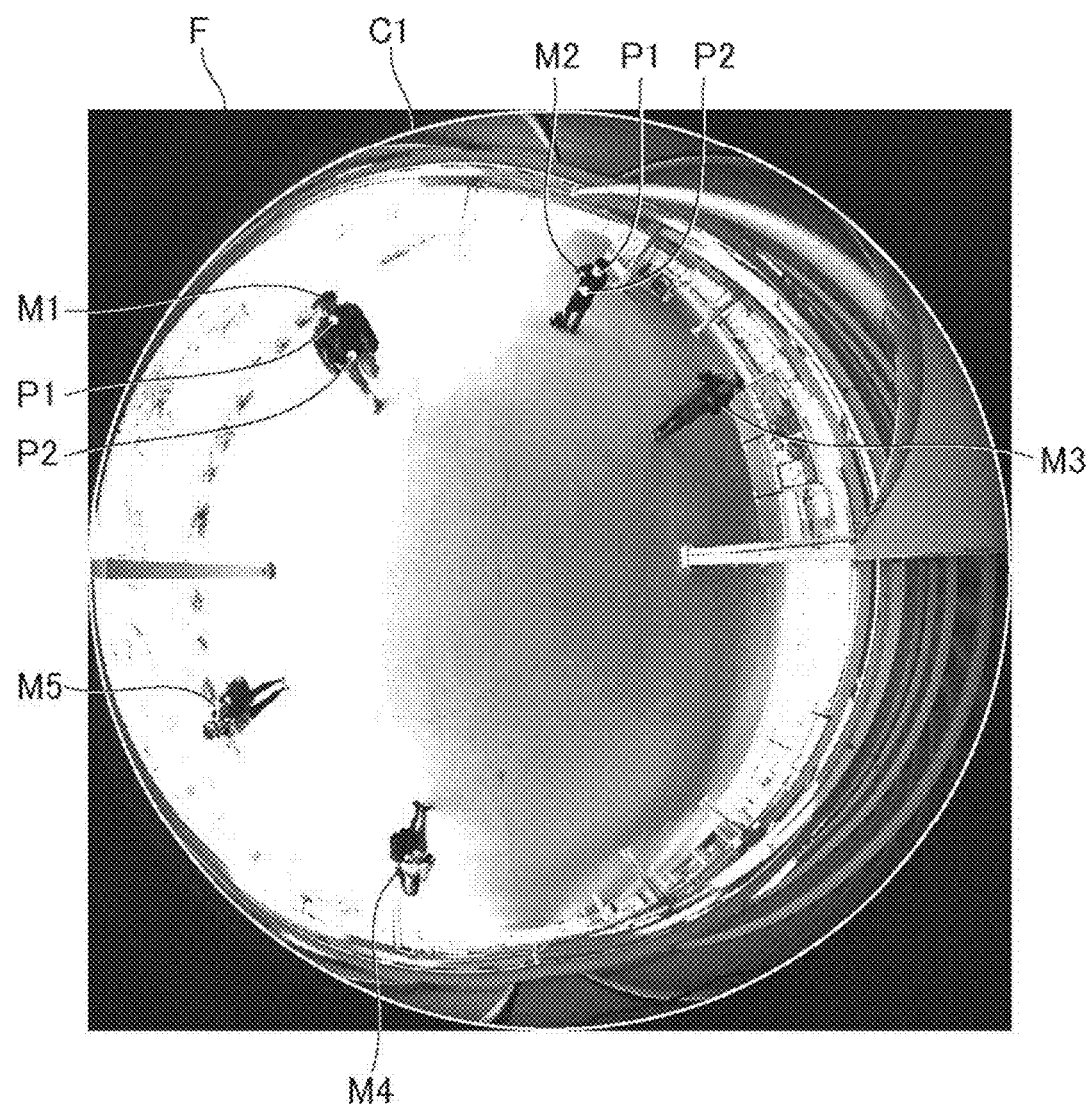
FIG. 5 is a diagram for describing processing of the image processing apparatus according to the present example embodiment.

The detection unit 12 performs processing of first analyzing the image in a rotation state illustrated in FIG. 5, and detecting a middle P1 of both shoulders and a middle P2 of a waist of each of the persons. In this case, the detection unit 12 can detect the points P1 and P2 of the persons M1 and M2 whose direction in which the body extends is close to an up-down direction in the diagram, but cannot detect the points P1 and P2 of the other persons.

Figure 6:
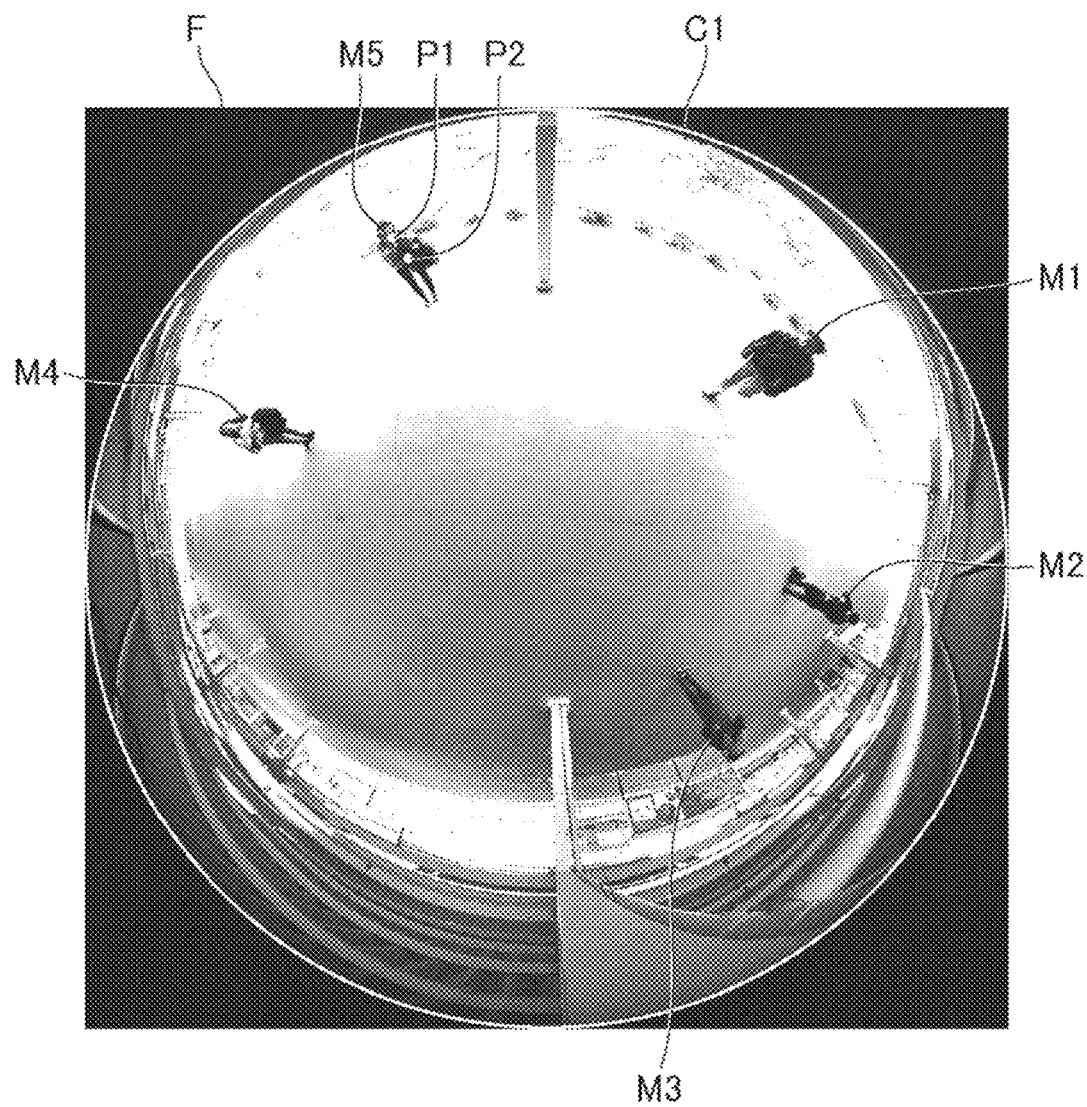
FIG. 6 is a diagram for describing processing of the image processing apparatus according to the present example embodiment.

Next, the detection unit 12 rotates the fisheye image F by 90°. Then, a state in FIG. 6 is acquired. The detection unit 12 performs processing of analyzing the image in the rotation state, and detecting the middle P1 of both shoulders and the middle P2 of a waist of each of the persons. In this case, the detection unit 12 can detect the points P1 and P2 of the person M5 whose direction in which the body extends is close to the up-down direction in the diagram, but cannot detect the points P1 and P2 of the other persons.

Figure 7:
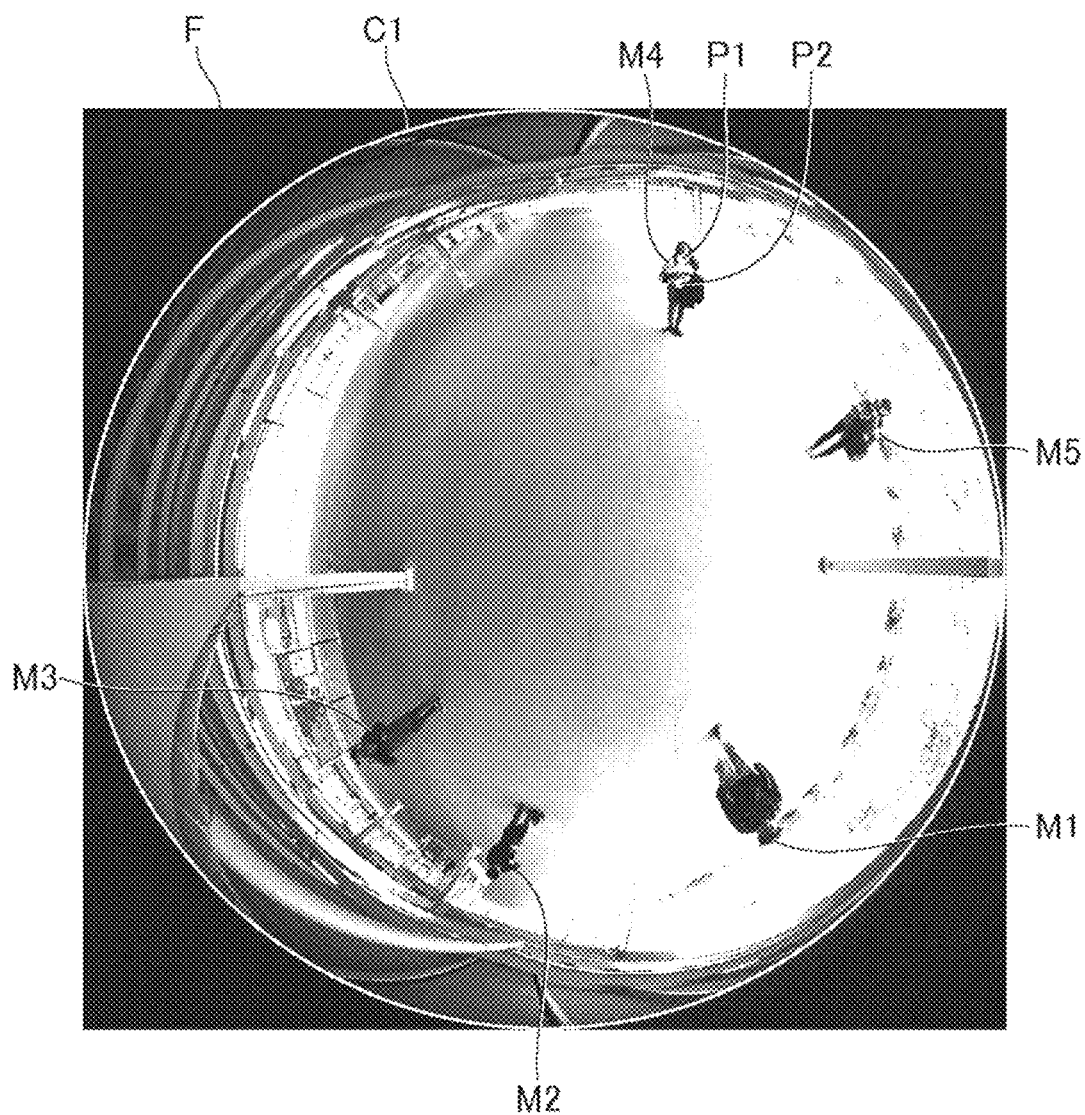
FIG. 7 is a diagram for describing processing of the image processing apparatus according to the present example embodiment.

Next, the detection unit 12 rotates the fisheye image F by 90°. Then, a state in FIG. 7 is acquired. The detection unit 12 performs processing of analyzing the image in the rotation state, and detecting the middle P1 of both shoulders and the middle P2 of a waist of each of the persons. In this case, the detection unit 12 can detect the points P1 and P2 of the person M4 whose direction in which the body extends is close to the up-down direction in the diagram, but cannot detect the points P1 and P2 of the other persons.

Figure 8:
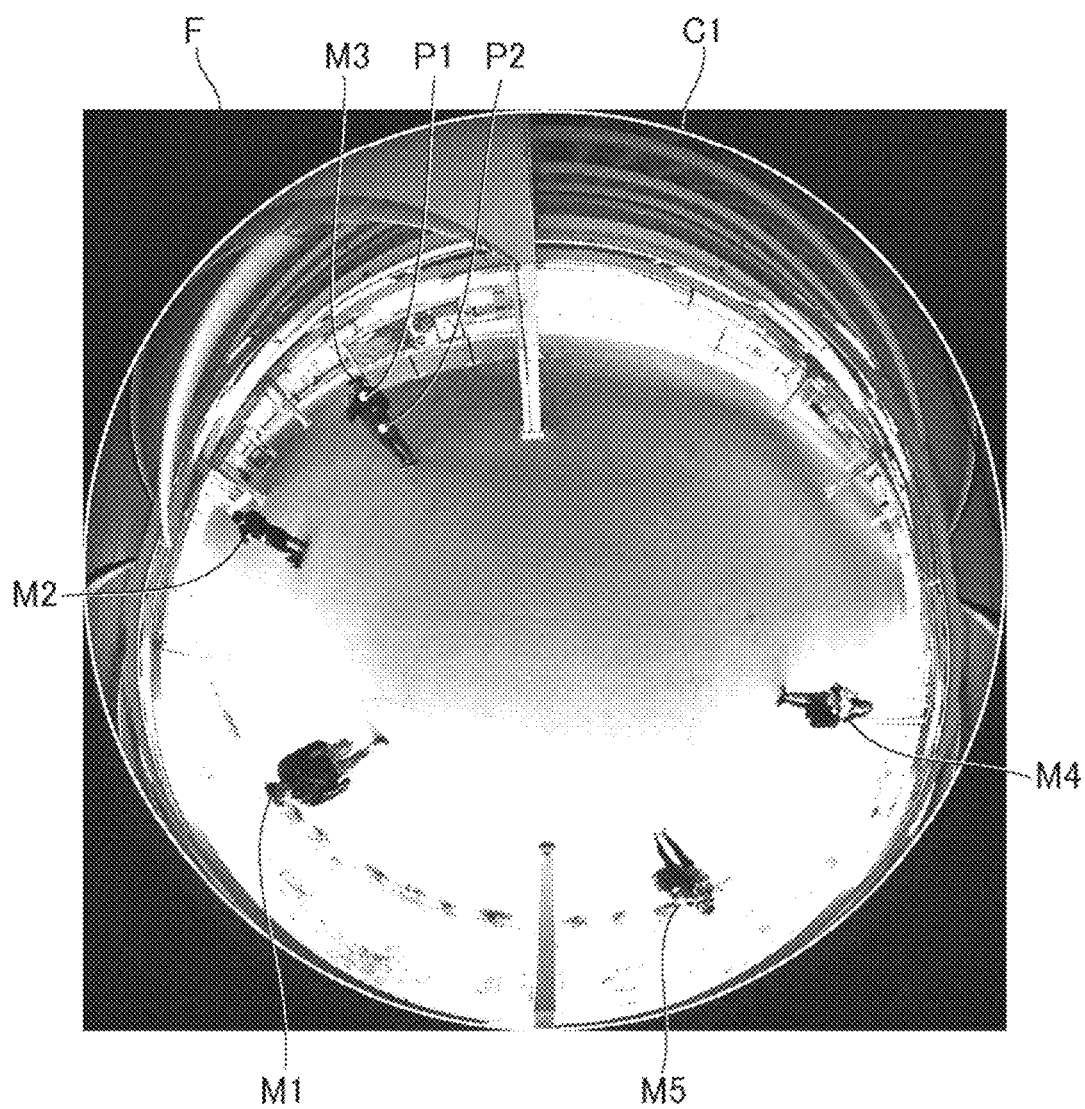
FIG. 8 is a diagram for describing processing of the image processing apparatus according to the present example embodiment.

Next, the detection unit 12 rotates the fisheye image F by 90°. Then, a state in FIG. 8 is acquired. The detection unit 12 performs processing of analyzing the image in the rotation state, and detecting the middle P1 of both shoulders and the middle P2 of a waist of each of the persons. In this case, the detection unit 12 can detect the points P1 and P2 of the person M3 whose direction in which the body extends is close to the up-down direction in the diagram, but cannot detect the points P1 and P2 of the other persons.

In this way, by analyzing a fisheye image while rotating the image, the detection unit 12 can detect a plurality of predetermined points of a body of each of a plurality of persons whose direction in which the body extends varies. Note that, in the example described above, rotation is made by 90°, but the example is merely one example, which is not limited thereto.

Returning to FIG. 4, the reference point decision unit 14 decides a reference point $(x_c, y_c)$, based on the gravity direction in the position of each of the plurality of persons in the fisheye image. Then, the reference point decision unit 14 stores the decided reference point $(x_c, y_c)$ in the storage unit 15.

When straight lines that each pass through a position of each of a plurality of persons and extend in a gravity direction in the position of each of the plurality of persons intersect at one point, the reference point decision unit 14 sets the intersection point as the reference point $(x_c, y_c)$.

On the other hand, when straight lines that each pass through a position of each of a plurality of persons and extend in a gravity direction in the position of each of the plurality of persons do not intersect at one point, the reference point decision unit 14 sets, as the reference point $(x_c, y_c)$, a point in which a distance from each of the plurality of straight lines satisfies a predetermined condition.

When the detection unit 12 detects a plurality of points (two points) of a body in which a line connecting the points is parallel to the gravity direction in an image generated by capturing a standing person from the front, a "straight line that passes through a position of each of a plurality of persons and extends in the gravity direction in the position of each of the plurality of persons" may be a line connecting the two points being detected by the detection unit 12.

Then, when the detection unit 12 detects a plurality of points (two points) of a body in which a line connecting the points is perpendicular to the gravity direction in an image generated by capturing a standing person from the front, a "straight line that passes through a position of each of a plurality of persons and extends in the gravity direction in the position of each of the plurality of persons" may be a line that passes through a middle point of the two points detected by the detection unit 12 and is perpendicular to a line connecting the two points.

Figure 9:
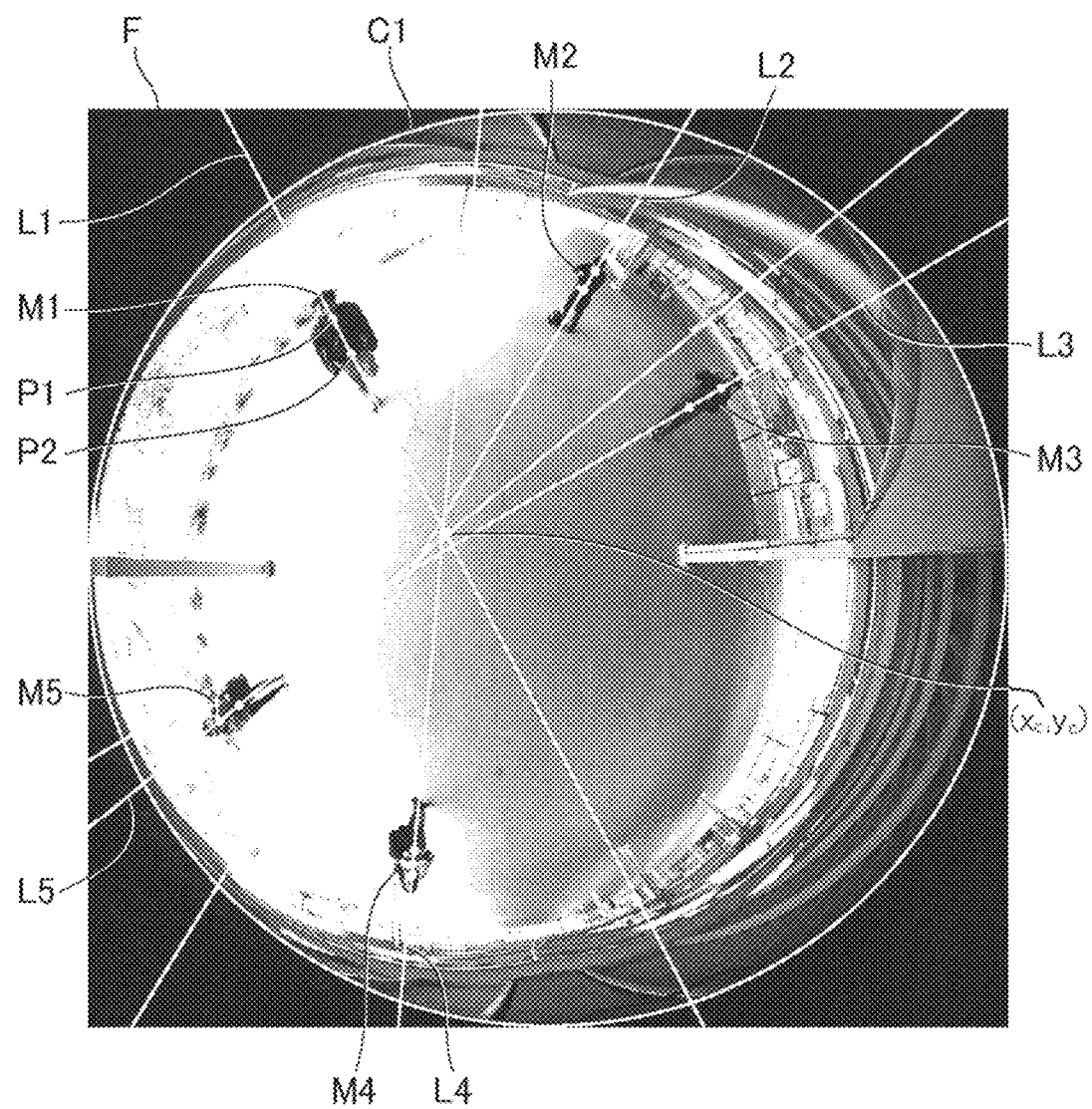
FIG. 9 is a diagram for describing processing of the image processing apparatus according to the present example embodiment.

FIG. 9 illustrates a concept of processing by the reference point decision unit 14. In the illustrated example, the detection unit 12 detects the plurality of points P1 and P2 of a body in which a line connecting the points is parallel to the gravity direction in an image generated by capturing a standing person from the front. Then, "straight lines L1 to L5 that each pass through a position of each of a plurality of persons and extend in the gravity direction in the position of each of the plurality of persons" are each a line connecting the points P1 and P2 being detected by the detection unit 12. In a case of the illustrated example, the plurality of straight lines L1 to L5 do not intersect at one point. Thus, the detection unit 12 sets, as the reference point $(x_c, y_c)$, a point in which a distance from each of the plurality of straight lines L1 to L5 satisfies a predetermined condition. The predetermined condition is, for example, a "sum of distances to a plurality of straight lines is minimum", which is not limited thereto.

For example, the detection unit 12 can compute a point that satisfies the predetermined condition, based on equations (1) to (3) below.

[Mathematical 1]

$$y = k_i x + c_i \qquad \text{Equation (1)}$$

[Mathematical 2]

$$Dist(x, y, k_i, c_i) = \frac{|k_i x - y + c_i|}{\sqrt{k_i^2 + 1}} \qquad \text{Equation (2)}$$

[Mathematical 3]

$$(x_c, y_c) = \underset{(x,y)}{\mathrm{argmin}} \sum_i Dist(x, y, k_i, c_i) \qquad \text{Equation (3)}$$

First, by the equation (1), each of the straight lines L1 to L5 is indicated. $k_i$ is a slope of each of the straight lines, and ci is an intercept of each of the straight lines. By the equation (2) and the equation (3), a point in which a sum of distances to the straight lines L1 to L5 is minimum can be computed as the reference point $(x_c, y_c)$.

Returning to FIG. 4, when the reference point $(x_c, y_c)$ is different from the center of an image in an image circle of a fisheye image, the complementary circular image generation unit 16 generates a complementary circular image. The complementary circular image is a circular image acquired by adding a complementary image to the image in the image circle, and is also an image with the reference point $(x_c, y_c)$ as the center. Note that, in the complementary circular image, a maximum value of a distance from the reference point $(x_c, y_c)$ to a point on a circumference of the image in the image circle may be a radius, and the image in the image circle may be inscribed. The complementary image added to the image in the image circle may be an image in a single color (for example: black), may be any pattern image, or may be others.

Figure 10:
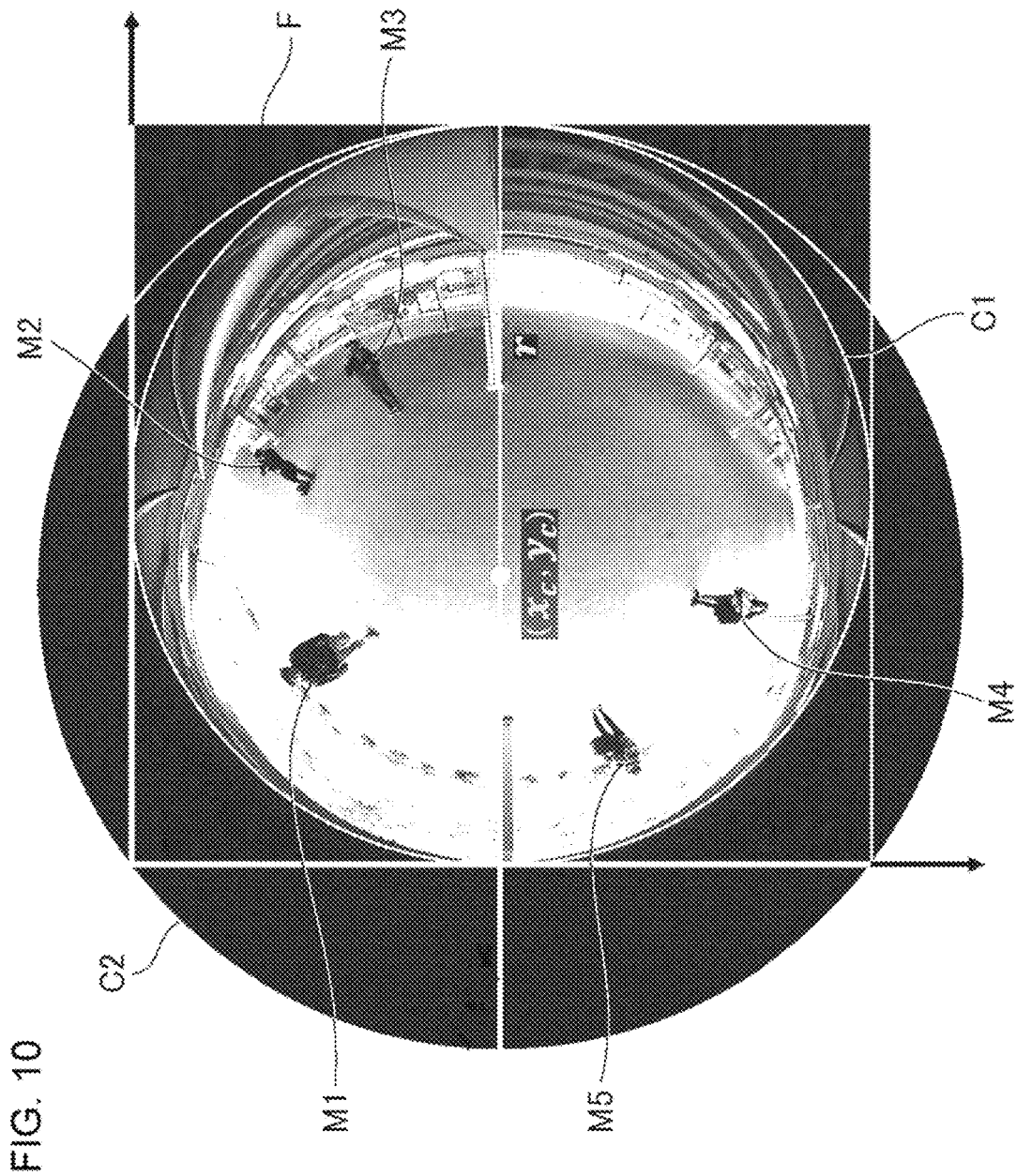
FIG. 10 is a diagram for describing processing of the image processing apparatus according to the present example embodiment.

FIG. 10 illustrates one example of a complementary circular image C2 generated by the complementary circular image generation unit 16. The complementary circular image C2 is generated by adding a complementary image in a single color of black to the image C1 in the image circle of the fisheye image F. The complementary circular image C2 has the reference point ($x_c, y_c$) as the center. Then, a radius r of the complementary circular image C2 is a maximum value of a distance from the reference point ($x_c, y_c$) to a point on a circumference of the image C1 in the image circle. Note that, the image C1 in the image circle is inscribed in the complementary circular image C2.

Note that, when the reference point ($x_c, y_c$) coincides with the center of an image in an image circle of a fisheye image, the complementary circular image generation unit 16 does not generate a complementary circular image.

Returning to FIG. 4, the expansion unit 17 panoramically expands a fisheye image, based on the reference point ($x_c, y_c$), and generates a panoramic image. Note that, when the reference point ($x_c, y_c$) is different from the center of an image in an image circle of a fisheye image, i.e., when the complementary circular image generation unit 16 generates a complementary circular image, the expansion unit 17 panoramically expands the complementary circular image, and generates a panoramic image. On the other hand, when the reference point ($x_c, y_c$) coincides with the center of an image in an image circle of a fisheye image, i.e., when the complementary circular image generation unit 16 does not generate a complementary circular image, the expansion unit 17 panoramically expands the image in the image circle of the fisheye image, and generates a panoramic image. The expansion unit 17 can perform panoramic expansion by using the technique described by using FIG. 1.

Note that, the expansion unit 17 can decide a reference line $L_s$ that does not overlap a person, cut open a complementary circular image or an image in an image circle from the reference line $L_s$, and generate a panoramic image. In this way, a trouble that a person in an image is separated into two portions in a panoramic image can be suppressed. For example, the expansion unit 17 may not set the reference line $L_s$ within a predetermined distance from a plurality of points of a body of each person being detected by the detection unit 12, and may set the reference line $L_s$ at a place at a predetermined distance or more from the plurality of detected points described above.

Next, one example of a flow of processing of the image processing apparatus 10 will be described. Note that, since details of each processing is described above, description herein will be appropriately omitted. First, one example of a flow of processing of deciding the reference point ($x_c, y_c$) will be described by using a flowchart in FIG. 11.

When a fisheye image is input, the detection unit 12 detects a plurality of predetermined points of a body of each of a plurality of persons from an image in an image circle (S10). For example, the detection unit 12 detects the middle P1 of both shoulders and the middle P2 of a waist of each of the persons.

Figure 12:
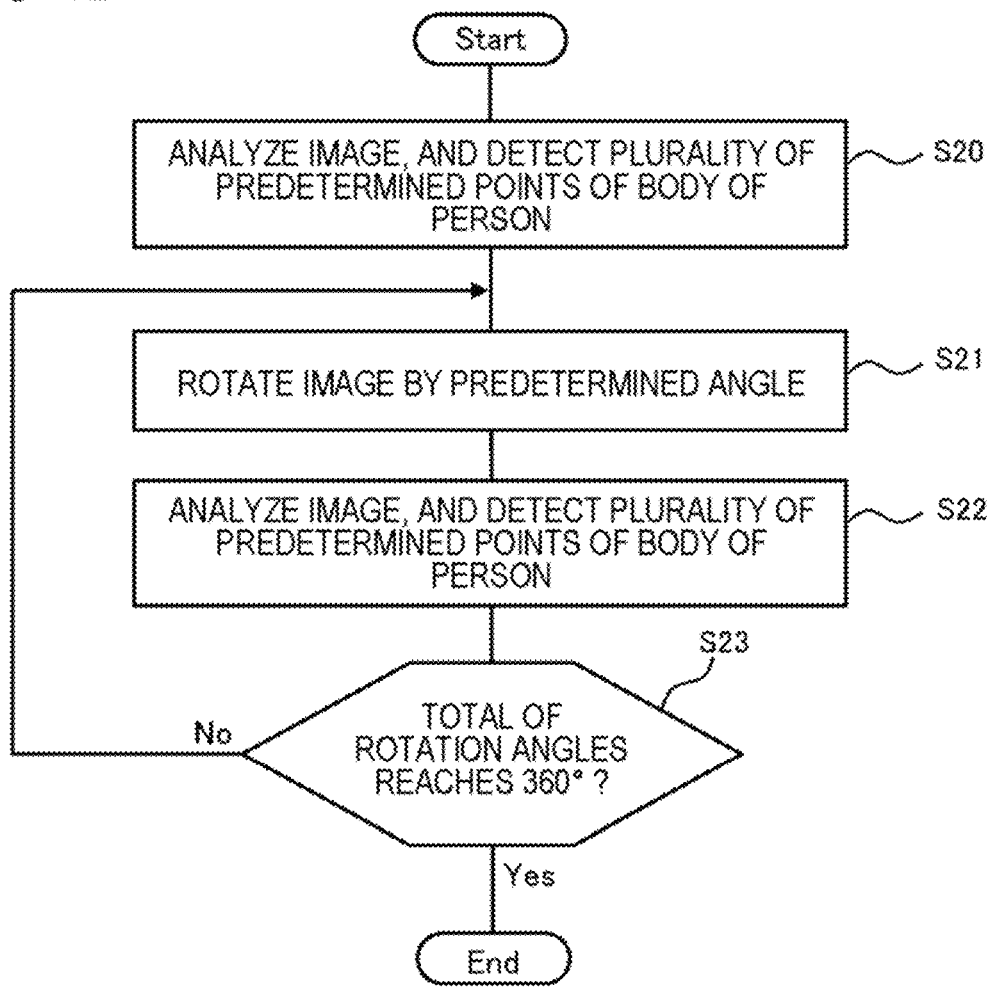
FIG. 12 is a flowchart illustrating one example of a flow of processing of the image processing apparatus according to the present example embodiment.

Herein, one example of a flow of the processing in S10 will be described by using a flowchart in FIG. 12. First, the detection unit 12 analyzes the image in the image circle, and detects the plurality of predetermined points of the body of each of the plurality of persons (S20). Then, the detection unit 12 rotates the image in the image circle by a predetermined angle (S21). The predetermined angle is, for example, 90°, which is not limited thereto.

Then, the detection unit 12 analyzes the image in the image circle after the rotation, and detects the plurality of predetermined points of the body of each of the plurality of persons (S22). Then, when a total of rotation angles does not reach 360° (No in S23), the detection unit 12 returns to S21 and repeats the similar processing. On the other hand, when a total of rotation angles reaches 360° (Yes in S23), the detection unit 12 ends the processing.

In this way, the detection unit 12 can perform, at a plurality of rotation angles, the processing of rotating an image in an image circle, analyzing the image in the image circle after the rotation, and detecting a plurality of predetermined points of a body of a person.

Returning to FIG. 11, after S10, the gravity direction determination unit 13 determines a gravity direction in a position of each of the plurality of persons, based on the plurality of predetermined points detected in S10 (S11). For example, the gravity direction determination unit 13 determines, as the gravity direction in the position of each of the persons, a direction from the middle P1 of both shoulders toward the middle P2 of a waist of each of the persons.

Next, the reference point decision unit 14 computes a straight line that passes through the position of each of the plurality of persons and extends in the gravity direction in each position (S12). Then, when a plurality of the straight lines intersect at one point (Yes in S13), the reference point decision unit 14 sets the intersection point as the reference point ($x_c, y_c$) (S14). On the other hand, when the plurality of straight lines do not intersect at one point (No in S13), the reference point decision unit 14 obtains a point in which a distance from each of the plurality of straight lines satisfies a predetermined condition (for example: shortest), and sets the point as the reference point ($x_c, y_c$) (S15).

Figure 13:
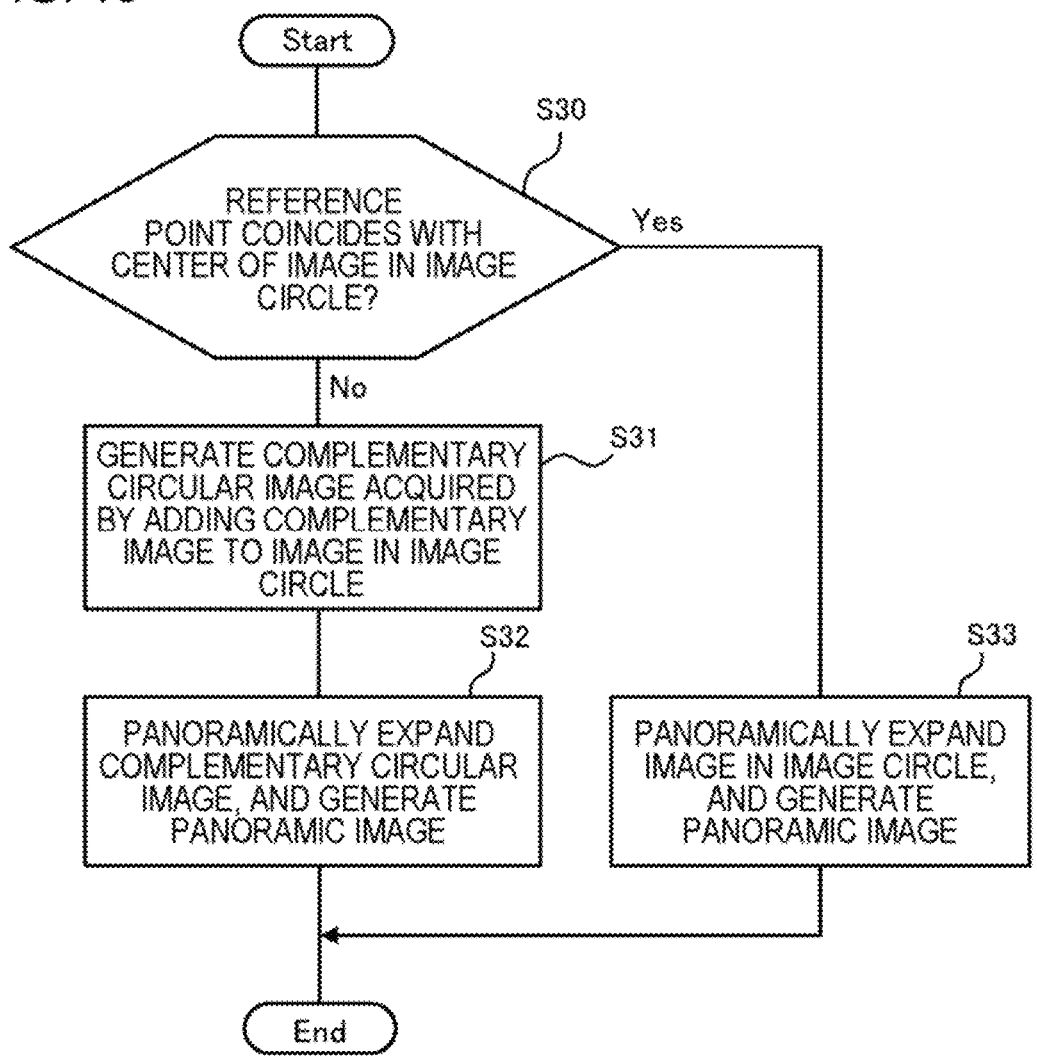
FIG. 13 is a flowchart illustrating one example of a flow of processing of the image processing apparatus according to the present example embodiment.

Next, one example of a flow of processing of generating a panoramic image from a fisheye image will be described by using a flowchart in FIG. 13.

Figure 11:
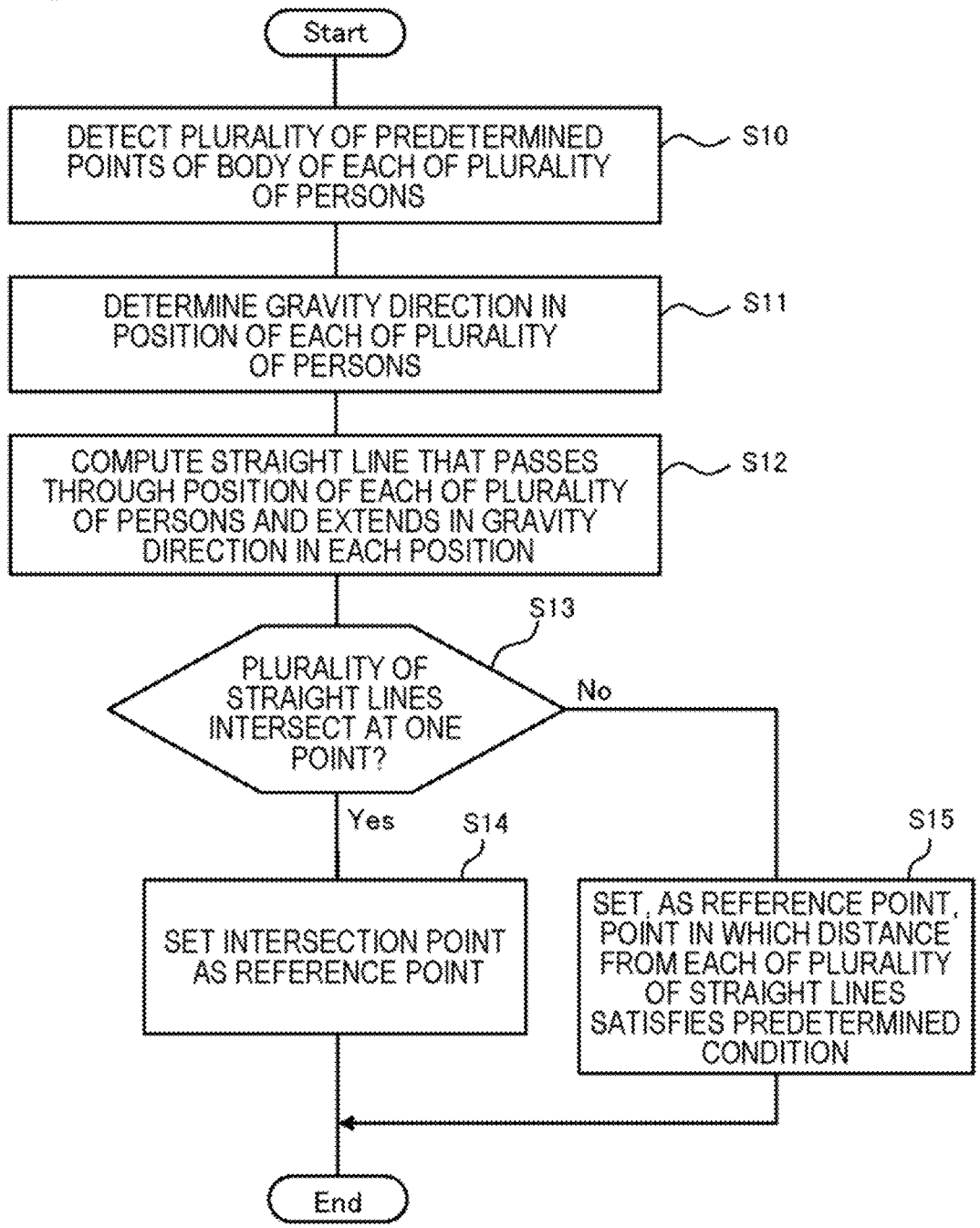
FIG. 11 is a flowchart illustrating one example of a flow of processing of the image processing apparatus according to the present example embodiment.

When the reference point ($x_c, y_c$) decided in the processing in FIG. 11 coincides with the center of the image in the image circle of the fisheye image (Yes in S30), the expansion unit 17 panoramically expands the image in the image circle of the fisheye image by using the technique described by using FIG. 1, and generates a panoramic image (S33). In other words, in this case, generation of a complementary circular image and panoramic expansion of the complementary circular image are not performed.

On the other hand, when the reference point ($x_c, y_c$) decided in the processing in FIG. 11 does not coincide with the center of the image in the image circle of the fisheye image (No in S30), the complementary circular image generation unit 16 generates a complementary circular image (S31). The complementary circular image is a circular image acquired by adding a complementary image to the image in the image circle, and is also an image with the reference point ($x_c, y_c$) as the center. Note that, in the complementary circular image, a maximum value of a distance from the reference point ($x_c, y_c$) to a point on a circumference of the image in the image circle may be a radius, and the image in the image circle may be inscribed. The complementary image added to the image in the image circle may be an image in a single color (for example: black), may be any pattern image, or may be others.

Then, the expansion unit 17 panoramically expands the complementary circular image by using the technique described by using FIG. 1, and generates a panoramic image (S32).

Note that, the image processing apparatus 10 may perform processing of deciding the reference point ($x_c, y_c$) described above on all fisheye images as a target of panoramic expansion. However, in a case of a surveillance camera and the like, a plurality of fisheye images are generated in a state where a position and an orientation of the camera are fixed. In a case of such a plurality of fisheye images, once the reference point ($x_c, y_c$) is computed, the reference point ($x_c, y_c$) can be applied to all of the fisheye images. Thus, the image processing apparatus 10 may perform, only on a fisheye image being input first, the processing of deciding the reference point ($x_c, y_c$) described above and panoramic expansion based on the decided reference point ($x_c, y_c$), and may perform, on a fisheye image being input subsequently, panoramic expansion based on the reference point ($x_c, y_c$) stored in the storage unit 15 without performing the processing of deciding the reference point ($x_c, y_c$) described above.

Figure 14:
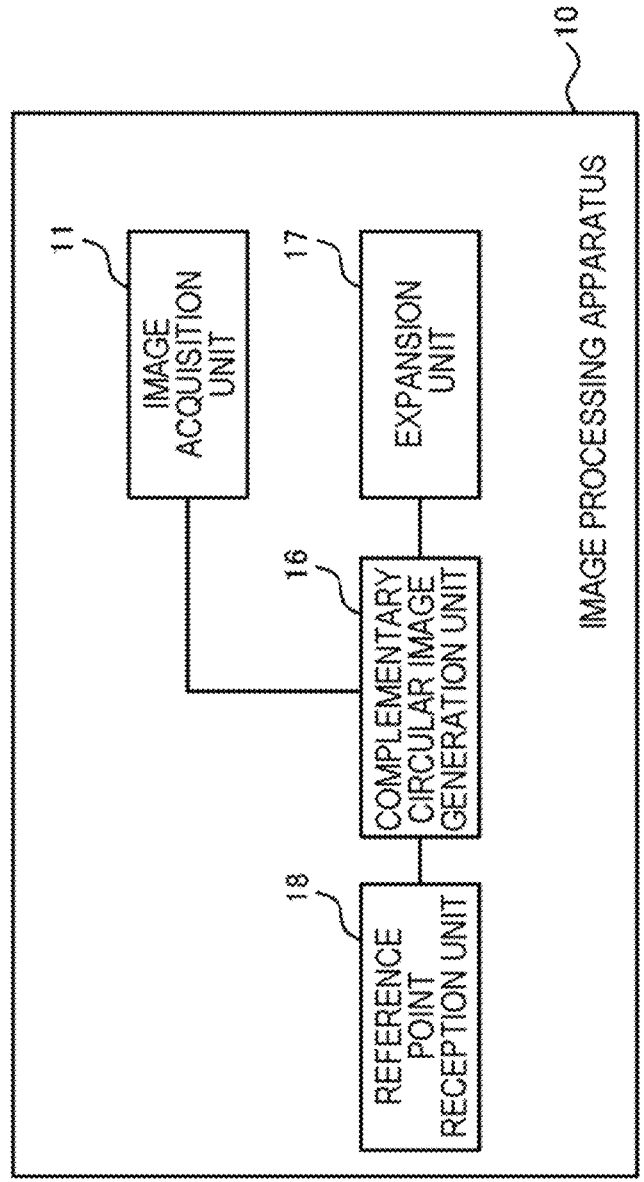
FIG. 14 is one example of a functional block diagram of the image processing apparatus according to the present example embodiment.

Herein, a modification example of the image processing apparatus 10 will be described. As illustrated in a functional block diagram in FIG. 14, the image processing apparatus 10 may not include the detection unit 12, the gravity direction determination unit 13, and the reference point decision unit 14. Then, the image processing apparatus 10 may include a reference point reception unit 18. The reference point reception unit 18 receives, by any means, a user input that sets any one point in a fisheye image as the reference point ($x_c, y_c$). A configuration of the image acquisition unit 11, the complementary circular image generation unit 16, and the expansion unit 17 is as described above. In a case of this modification example, the reference point ($x_c, y_c$) is decided by a user input instead of being computed by the image processing apparatus 10.

<Functional Configuration of Processing Apparatus 20>

Next, a functional configuration of the processing apparatus 20 will be described in detail. The processing apparatus 20 estimates person behavior indicated by a plurality of time-series images by using a technique of machine learning.

Figure 15:
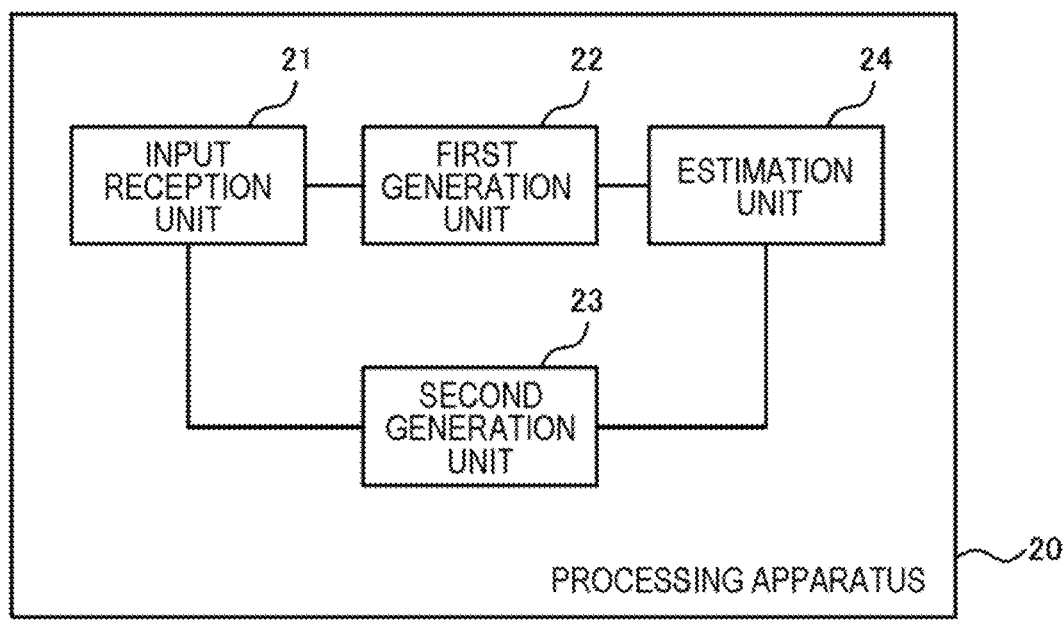
FIG. 15 is one example of a functional block diagram of the processing apparatus according to the present example embodiment.

FIG. 15 is one example of a functional block diagram of the processing apparatus 20. As illustrated, the processing apparatus 20 includes an input reception unit 21, a first generation unit 22, a second generation unit 23, and an estimation unit 24.

The input reception unit 21 receives an input of a plurality of time-series images. For example, a plurality of time-series panoramic images generated by the image processing apparatus 10 are input.

The first generation unit 22 generates, from the plurality of time-series images, three-dimensional feature information indicating a time change of a feature in each position in the image. For example, the first generation unit 22 can generate three-dimensional feature information, based on a 3D CNN (for example, a convolutional deep learning network such as 3D Resnet, and the like, which is not limited thereto).

The second generation unit 23 generates person position information indicating a position in which a person is present in each of the plurality of images. When a plurality of persons are present in an image, the second generation unit 23 can generate person position information indicating a position in which each of the plurality of persons is present. For example, the second generation unit 23 extracts a silhouette (whole body) of a person in an image, and generates person position information indicating an area in the image containing the extracted silhouette. For example, the second generation unit 23 can generate person position information, based on a deep learning technique, more specifically, based on a "deep learning network of object recognition" that recognizes every object (for example, a person) from a planar image and a video at high speed and with high accuracy. As the deep learning network of object recognition, a mask-RCNN, an RCNN, a fast RCNN, a faster RCNN, and the like are exemplified, which are not limited thereto.

The estimation unit 24 estimates person behavior indicated by the plurality of images, based on the time change of the feature indicated by the three-dimensional feature information in the position in which the person is present being indicated by the person position information. For example, the estimation unit 24 can perform, on the three-dimensional feature information, correction for changing a value in a position except for the position in which the person is present being indicated by the person position information to a predetermined value (for example: 0), and can then estimate person behavior indicated by the plurality of images, based on the three-dimensional feature information after the correction. The estimation unit 24 can estimate person behavior, based on an estimation model being generated in advance by machine learning and the three-dimensional feature information after the correction.

Figure 16:
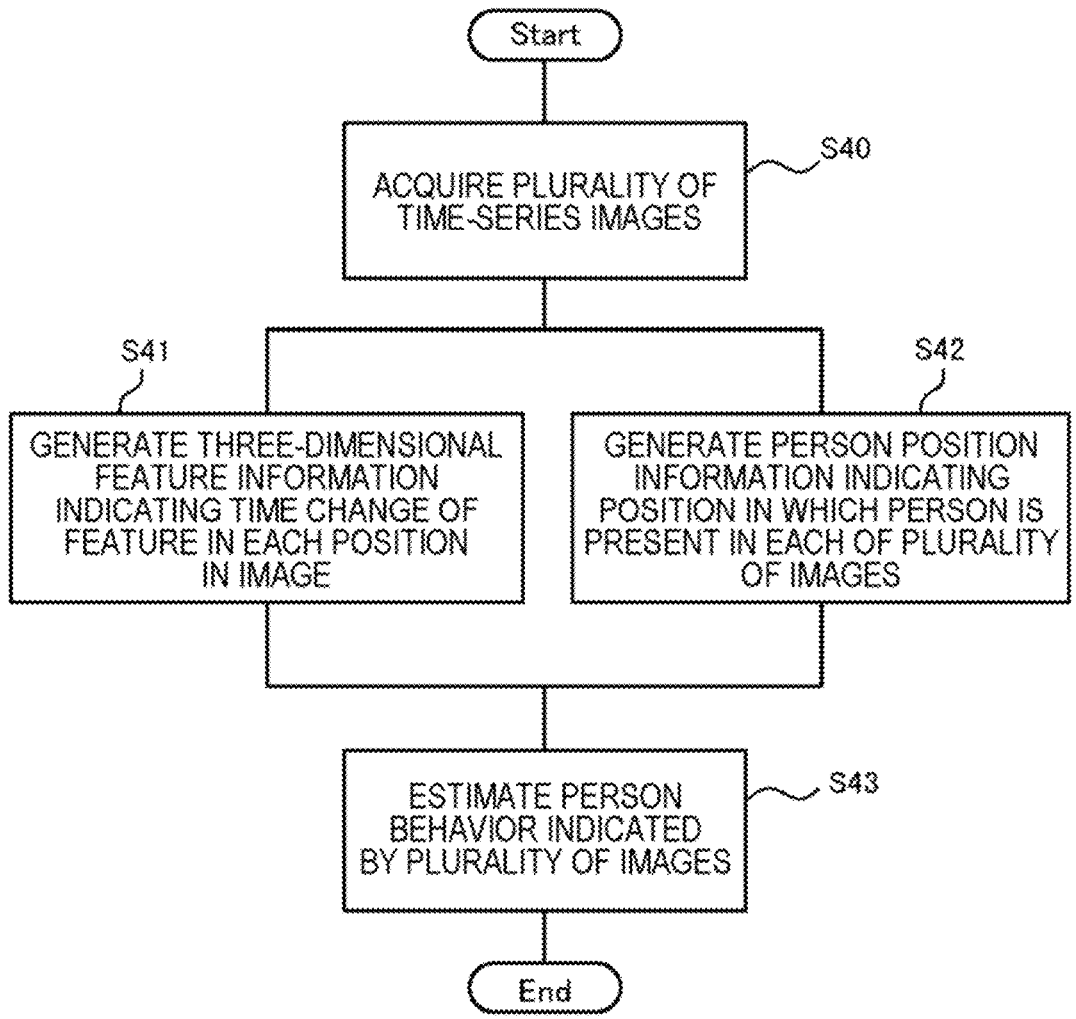
FIG. 16 is a flowchart illustrating one example of a flow of processing of the processing apparatus according to the present example embodiment.

Herein, one example of a flow of processing of the processing apparatus 20 will be described by using a flowchart in FIG. 16.

First, the input reception unit 21 acquires a plurality of time-series images (S40).

Then, the first generation unit 22 generates, from the plurality of time-series images, three-dimensional feature information indicating a time change of a feature in each position in the image (S41). Further, the second generation unit 23 generates person position information indicating a position in which a person is present in each of the plurality of images (S42).

Then, the estimation unit 24 estimates person behavior indicated by the plurality of images, based on the time change of the feature indicated by the three-dimensional feature information in the position in which the person is present being indicated by the person position information (S43).

Figure 17:
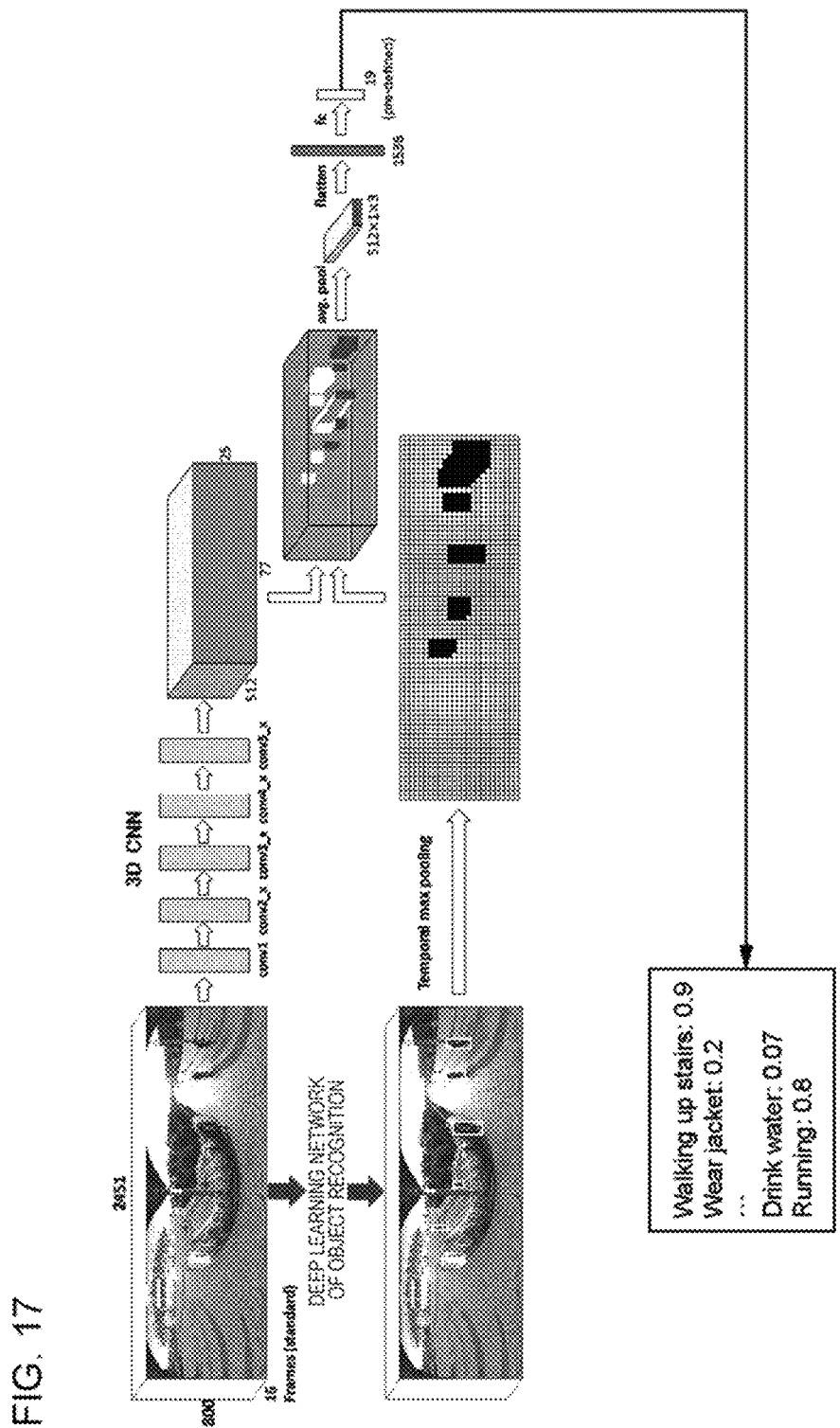
FIG. 17 is a diagram for describing an example of the processing apparatus according to the present example embodiment.

Next, an example of the processing apparatus 20 will be described by using FIG. 17. Note that, the example is merely one example, which is not limited thereto.

First, time-series images of 16 frames (16×2451×800) are input to the processing apparatus 20. Then, the processing apparatus 20 generates, from the images of the 16 frames, three-dimensional feature information (512×77×25) being convolutional in 512 channels, based on a 3D CNN (for example, a convolutional deep learning network such as 3D Resnet, and the like, which is not limited thereto). Further, the processing apparatus 20 generates person position information indicating a position in which a person is present in each of the images of the 16 frames, based on a deep learning network of object recognition such as a mask-RCNN. In the illustrated example, the person position information indicates a position in each of a plurality of rectangular areas containing each person.

Next, the processing apparatus 20 performs, on the three-dimensional feature information, correction for changing a value in a position except for the position in which the person is present being indicated by the person position information to a predetermined value (for example: 0). Subsequently, the processing apparatus 20 puts data together in 512×1×3 by average pooling, and then one-dimensionally converts the data by flatten (1536). Next, the processing apparatus 20 inputs the one-dimensional data to a fully-connected layer, and acquires a probability (output value) associated with each of a plurality of categories (person behavior). In the illustrated example, 19 categories are defined and learned. The 19 categories are "walk", "run", "wave hand", "pick up object", "throw away object", "take off jacket", "wear jacket", "make call", "use smartphone", "eat snack", "walk up stairs", "walk down stairs", "drink water", "shake hands", "take object from another person's pocket", "hand object to another person", "push another person", "hold card and enter station premise", and "hold card and leave station gate", which are not limited thereto. For example, the processing apparatus 20 estimates that person behavior associated with a category having the probability equal to or more than a threshold value is indicated by the image.

Note that, by tracing in a direction opposite to the flow described above, a position in the image indicating a category (person behavior) having the probability equal to or more than the threshold value can be computed.

ADVANTAGEOUS EFFECT

The image processing apparatus 10 according to the present example embodiment described above can perform panoramic expansion with an appropriate position in a fisheye image as the reference point $(x_c, y_c)$ instead of performing panoramic expansion uniformly with the center of an image in an image circle of a fisheye image as the reference point $(x_c, y_c)$. Thus, a trouble that a direction in which a body of a standing person extends varies in a panoramic image can be suppressed. As a result, by inputting the panoramic image to an estimation model generated by machine learning based on an image (learning data) generated by a standard lens camera, person behavior indicated by the image can be estimated with high accuracy.

Further, the image processing apparatus 10 according to the present example embodiment can detect a plurality of predetermined points of a body of each of a plurality of persons included in an image, determine a gravity direction in a position of each of the plurality of persons, based on the plurality of points, and then decide the reference point $(x_c, y_c)$, based on the gravity direction in the position of each of the plurality of persons. Such an image processing apparatus 10 can decide, with high accuracy, the appropriate reference point $(x_c, y_c)$ in order to suppress the trouble described above.

Further, the image processing apparatus 10 according to the present example embodiment can detect a plurality of predetermined points of a body of each of a plurality of persons while rotating a fisheye image. Thus, even when a direction in which a body of a standing person extends varies in a fisheye image, a plurality of predetermined points of a body of each of a plurality of persons in the fisheye image can be detected with high accuracy by processing similar to image analysis processing performed on an image generated by a standard lens camera.

Further, when the decided reference point $(x_c, y_c)$ is different from the center of an image in an image circle of a fisheye image, the image processing apparatus 10 according to the present example embodiment can generate a complementary circular image that is a circular image acquired by adding a complementary image to the image in the image circle and has the decided reference point $(x_c, y_c)$ as the center, and can panoramically expand the complementary circular image. Thus, even when the decided reference point $(x_c, y_c)$ is different from the center of an image in an image circle of a fisheye image, the image processing apparatus 10 can panoramically expand the fisheye image by using the technique disclosed in FIG. 1.

Further, the image processing apparatus 10 according to the present example embodiment can decide the reference line $L_s$ in such a way that the reference line $L_s$ does not overlap a person, cut open a complementary circular image or an image in an image circle from the reference line $L_s$, and generate a panoramic image. Thus, a trouble that a person in an image is separated into two portions in a panoramic image can be suppressed. As a result, based on the panoramic image, person behavior indicated by the image can be estimated with high accuracy.

Further, the image processing apparatus 10 according to the present example embodiment can store, in advance, the reference point $(x_c, y_c)$ computed once in the storage unit 15 in consideration of a case where a plurality of images are generated in a state where a position and an orientation of a camera such as a surveillance camera, for example, are fixed, and can subsequently perform panoramic expansion, based on the reference point $(x_c, y_c)$ stored in the storage unit 15. In other words, processing of deciding the reference point $(x_c, y_c)$ can be performed only on one fisheye image instead of performing the processing of deciding the reference point $(x_c, y_c)$ on all fisheye images, and the processing of deciding the reference point $(x_c, y_c)$ on another fisheye image can be omitted. As a result, a processing load on the image processing apparatus 10 can be reduced.

Further, the processing apparatus 20 according to the present example embodiment can generate three-dimensional feature information indicating a time change of a feature in each position in an image, based on a 3D-CNN, then extract only information about a position in which a person is detected from the generated information (invalidate other information), and perform estimation of person behavior by using only the information related to the person in the three-dimensional feature information. Estimation can be performed with unnecessary information being eliminated and only necessary information being narrowed down, and thus estimation accuracy is improved, and a processing load on a computer is also reduced.

Modification Example

Herein, a modification example of the present example embodiment will be described. When a fisheye image is input, the image processing apparatus 10 that outputs a panoramic image may be used for a purpose other than for an input of a panoramic image to the processing apparatus 20. Further, to the processing apparatus 20, a panoramic image generated by the image processing apparatus 10 may be input, a panoramic image generated by another apparatus may be input, or an image generated by a standard lens camera may be input.

Further, the image processing apparatus 10 and the processing apparatus 20 are described separately in the example embodiment described above, but the image processing apparatus 10 and the processing apparatus 20 may be formed in such a way as to be separated physically and/or logically, or may be formed in such a way as to be integrated physically and/or logically.

The invention of the present application is described above with reference to the example embodiment (and example), but the invention of the present application is not limited to the example embodiment (and example) described above. Various modifications that can be understood by those skilled in the art can be made to the configuration and the details of the invention of the present application within the scope of the invention of the present application.

A part or the whole of the above-described example embodiment may also be described as in supplementary notes below, which is not limited thereto.

1. An image processing apparatus or an image processing system, including:

a complementary circular image generation means for generating a complementary circular image that is a circular image acquired by adding a complementary image to an image in an image circle in an image generated by a fisheye lens camera, and that has, as a center, a reference point different from a center of the image in the image circle; and an expansion means for panoramically expanding the complementary circular image, based on the reference point, and generating a panoramic image.

2. The image processing apparatus or the image processing system according to supplementary note 1, wherein the complementary circular image generation means generates the complementary circular image in which a maximum value of a distance from the reference point to a point on a circumference of the image in the image circle is a radius.

3. The image processing apparatus or the image processing system according to supplementary note 1 or 2, wherein the expansion means decides a reference line that does not overlap a person, cuts open the complementary circular image from the reference line, and generates the panoramic image.

4. The image processing apparatus or the image processing system according to any of supplementary notes 1 to 3, further including:

a detection means for detecting a plurality of predetermined points of a body of each of a plurality of persons from the image in the image circle;

a gravity direction determination means for determining a gravity direction in a position of each of a plurality of persons, based on the plurality of predetermined points; and a reference point decision means for deciding the reference point, based on a gravity direction in the position of each of the plurality of persons.

5. The image processing apparatus or the image processing system according to supplementary note 4, wherein, when a straight line that passes through a position of each of the plurality of persons and extends in a gravity direction in the position of each of the plurality of persons intersects at one point, the reference point decision means sets an intersection point as the reference point.

6. The image processing apparatus or the image processing system according to supplementary note 4 or 5, wherein, when a straight line that passes through a position of each of the plurality of persons and extends in a gravity direction in the position of each of the plurality of persons does not intersect at one point, the reference point decision means sets, as the reference point, a point in which a distance from each of a plurality of the straight lines satisfies a predetermined condition.

7. The image processing apparatus or the image processing system according to any of supplementary notes 4 to 6, wherein the detection means detects a plurality of points of a body in which a line connecting the points is parallel to a gravity direction in an image generated by capturing a standing person from the front.

8. The image processing apparatus or the image processing system according to any of supplementary notes 4 to 6, wherein the detection means detects a plurality of points of a body in which a line connecting the points is perpendicular to a gravity direction in an image generated by capturing a standing person from the front.

9. The image processing apparatus or the image processing system according to any of supplementary notes 4 to 8, wherein the detection means performs, at a plurality of rotation angles, processing of rotating the image in the image circle, analyzing the image in the image circle after the rotation, and detecting a plurality of predetermined points of a body of a person.

10. The image processing apparatus or the image processing system according to any of supplementary notes 4 to 9, wherein, when the reference point does not coincide with a center of the image in the image circle, the storing circular image generation means generates the storing circular image, and the expansion means panoramically expands the complementary circular image.

11. The image processing apparatus or the image processing system according to any of supplementary notes 4 to 10, wherein, when the reference point coincides with a center of the image in the image circle, the storing circular image generation means does not generate the storing circular image, and the expansion means panoramically expands the image in the image circle.

12. An image processing method, including:

by a computer, generating a complementary circular image that is a circular image acquired by adding a complementary image to an image in an image circle in an image generated by a fisheye lens camera, and that has, as a center, a reference point different from a center of the image in the image circle; and panoramically expanding the complementary circular image, based on the reference point, and generating a panoramic image.

13. A program causing a computer to function as:

a complementary circular image generation means for generating a complementary circular image that is a circular image acquired by adding a complementary image to an image in an image circle in an image generated by a fisheye lens camera, and that has, as a center, a reference point different from a center of the image in the image circle; and an expansion means for panoramically expanding the complementary circular image, based on the reference point, and generating a panoramic image.

What is claimed is:

1. An image processing apparatus, comprising:

at least one memory storing one or more instructions; and at least one processor configured to execute the one or more instructions to:

generate a complementary circular image that is a circular image acquired by adding a complementary image to an image in an image circle in an image generated by a fisheye lens camera, and that has, as a center, a reference point different from a center of the image in the image circle; and panoramically expand the complementary circular image, based on the reference point, and generate a panoramic image.

2. The image processing apparatus according to claim 1, wherein the at least one processor configured to execute the one or more instructions to generate the complementary circular image in which a maximum value of a distance from the reference point to a point on a circumference of the image in the image circle is a radius.

3. The image processing apparatus according to claim 1, wherein
the at least one processor configured to execute the one or more instructions to decide a reference line that does not overlap a person, cut open the complementary circular image from the reference line, and generate the panoramic image.

4. The image processing apparatus according to claim 1, wherein the processor is further configured to execute the one or more instructions to:
detect a plurality of predetermined points of a body of each of a plurality of persons from the image in the image circle;
determine a gravity direction in a position of each of a plurality of persons, based on the plurality of predetermined points; and
decide the reference point, based on a gravity direction in the position of each of the plurality of persons.

5. The image processing apparatus according to claim 4, wherein,
the at least one processor configured to execute the instructions to set an intersection point as the reference point in case of a straight line that passes through a position of each of the plurality of persons and extends in a gravity direction in the position of each of the plurality of persons intersects at one point.

6. The image processing apparatus according to claim 4, wherein, the at least one processor configured to execute the one or more instructions to set, as the reference point, a point in which a distance from each of a plurality of the straight lines satisfies a predetermined condition in case of a straight line that passes through a position of each of the plurality of persons and extends in a gravity direction in the position of each of the plurality of persons does not intersect at one point.

7. The image processing apparatus according to claim 4, wherein
the at least one processor configured to execute the one or more instructions to detect a plurality of points of a body in which a line connecting the points is parallel to a gravity direction in an image generated by capturing a standing person from the front.

8. The image processing apparatus according to claim 4, wherein
the at least one processor configured to execute the one or more instructions to detect a plurality of points of a body in which a line connecting the points is perpendicular to a gravity direction in an image generated by capturing a standing person from the front.

9. The image processing apparatus according to claim 1, wherein
the at least one processor configured to execute the one or more instructions to perform, at a plurality of rotation angles, processing of rotating the image in the image circle, analyzing the image in the image circle after the rotation, and detecting a plurality of predetermined points of a body of a person.

10. The image processing apparatus according to claim 4, wherein,
the at least one processor configured to execute the one or more instructions to:
generate the complementary circular image in case of the reference point does not coincide with a center of the image in the image circle, and
panoramically expand the complementary circular image.

11. The image processing apparatus according to claim 4, wherein
the at least one processor configured to execute the one or more instructions to panoramically expand the image in the image circle instead of the complementary circular image in case of the reference point coincides with a center of the image in the image circle.

12. An image processing method, comprising:
generating a complementary circular image that is a circular image acquired by adding a complementary image to an image in an image circle in an image generated by a fisheye lens camera, and that has, as a center, a reference point different from a center of the image in the image circle; and
panoramically expanding the complementary circular image, based on the reference point, and generating a panoramic image.

13. A non-transitory storage medium storing a program causing a computer to:
generate a complementary circular image that is a circular image acquired by adding a complementary image to an image in an image circle in an image generated by a fisheye lens camera, and that has, as a center, a reference point different from a center of the image in the image circle; and
panoramically expand the complementary circular image, based on the reference point, and generate a panoramic image.

* * * * *